Sept. 12, 1967 M. J. ARPS ET AL 3,341,073

METERING AND DISPENSING APPARATUS

Filed April 14, 1965 4 Sheets-Sheet 1

INVENTORS
MILTON J. ARPS
EDWARD J. RIPPL
BY
Andrus & Starke
Attorneys

United States Patent Office 3,341,073
Patented Sept. 12, 1967

3,341,073
METERING AND DISPENSING APPARATUS
Milton J. Arps, P.O. Box 76, Appleton, Wis. 54911, and Edward J. Rippl, 215 Broad St., Menasha, Wis. 54952
Filed Apr. 14, 1965, Ser. No. 447,998
17 Claims. (Cl. 222—36)

This invention relates to a metering and dispensing apparatus and more particularly to apparatus for automatically metering and dispensing individual liquid components, as well as blends or mixtures of the individual components.

When mixing drinks in a restaurant or bar, the bartender in most cases will measure the liquor by means of a "shot" glass or other measuring glass. When mixed in this manner, the quality of the drink is never completely uniform due to variations in the quantity of liquor which may be used in the drink. This nonuniformity of quantity is even more apparent where the bartender does not use a "shot" glass in measuring the amount of liquor but instead, merely pours what he considers to be a representative quantity.

In addition to nonuniformity, there is a tendency for the bartender to overpour with the result that the amount of liquor being used in the drink is in excess of the measured volume of the "shot" glass. Further, there is a certain amount of waste or spillage when manually pouring drinks which can amount to a considerable quantity over an extended period.

Another problem confronting the owner of a restaurant or bar is that of pilferage. No accurate means is available to the owner for determining the number of drinks which are mixed and sold, and thus the revenue or income from the drinks is solely dependent on the honesty of the bartender.

While many attempts have been made in the past to construct a fully automatic drink dispensing device in order to eliminate the above problems, none has met with complete success. In one type of device, bottles of liquor are held in a rack and the liquor is individually dispensed by a valve mechanism in a metered amount. While this type of device does produce a measured quantity of liquor, it is slow and does not eliminate the pilferage problem.

The present invention is directed to an apparatus for automatically dispensing individual liquid components as well as blending the individual components to provide mixed combinations.

The apparatus is particularly adaptable for a restaurant or bar in dispensing individual liquors such as gin, whiskey, vermouth, scotch and the like, as well as mixing and dispensing mixed drinks such as martinis, manhattans, etc. More specifically, the apparatus includes a rack which contains a series of inverted bottles of the basic liquors, such as gin, whiskey, scotch and the like. A stopper is inserted into the neck of each bottle and the stopper is formed integrally with a fluid control unit or valve block containing a liquid outlet and a pneumatic pressure inlet. When the valve blocks is properly located on a manifold bar, the liquid outlet is automatically connected to a liquid line leading to a dispenser, and the pneumatic pressure inlet is connected to a source of air or other gas under pressure. The gas pressure acts against the upper surface of the liquid in each bottle to force the liquid out of the bottle through the outlet line to the dispenser which is located at the bar. To control the flow of liquid through each individual liquid line, a solenoid valve is associated with each liquid line.

The solenoid valves are individually energized by a timer acting through a circuit which is controlled by a series of push buttons located on a control panel. A push button is provided for each of the basic liquors as well as for each of the desired mixed drinks. By depressing one of the buttons a timing circuit is energized to dispense that particular liquor or mixed drink for a regulated time period depending on the drink selected.

The use of air or gas pressure to dispense the liquid from the individual bottles in connection with a timing mechanism provides a very accurate control of volume, for a constant pressure is applied to the liquid regardless of whether the individual bottles are full or empty. Further, the use of the pressurized feed insures a positive uniform flow of liquid as opposed to a gravity feed system in which the liquid will not flow unless air is introduced into the evacuated portion of the bottle. As an added advantage, the pressurized flow insures that there will be no drippage from the liquid outlets at the dispensing unit, for the portion of each liquid line extending from the solenoid valve to the outlet of the dispenser is filled with the liquid and due to the small diameter of the piping and the surface tension of the liquid at the outlet, there will be no drippage from the outlet when the solenoid valve is closed.

The use of the pressurized delivery also enables the liquid to be forced through long distances so that the bottle rack can be located at one portion of the bar or restaurant and the dispensing unit can be located at another portion of the bar. As the drinks are all dispensed from a single dispensing station, the amount of walking which a bartender is normally required to do when mixing a wide variety of drinks is reduced.

The pressurized delivery also enables the drinks to be dispensed in a very short period of time.

As an additional feature, a provision is made to indicate when each bottle in the rack is empty and to prevent dispensing of a fractional quantity of that particular liquid. A probe, float switch or other liquid sensing member is located in the liquid line leading from the bottle to the solenoid valve, and when the liquid level falls below the probe or float switch, the circuit is opened so that the solenoid valve cannot be energized to dispense further liquid until the empty bottle is replaced with a full bottle. As the portion of the liquid line extending from the probe to the dispensing unit contains a quantity of liquid greater than the dispensed amount, a fractional amount cannot be dispensed prior to opening of the circuit.

The apparatus also includes a counting mechanism which tabulates the number of drinks which have been dispensed. It is contemplated that the drinks will be divided into various price classifications and the drinks dispensed in each classification will be tabulated as well as the overall number of drinks which were dispensed. This gives the owner a close control over the number of drinks that are dispensed and the price of each drink.

The dispensing unit of the invention provides a positive volume control without waste or spillage of liquid. Moreover, by providing a positive volume control, it insures that the quality of the drinks will be identical.

The dispensing unit will not only dispense individual liquors but will also mix a wide variety of drinks with each mixed drink having given quantities or volumes of the basic components.

The counters which are associated with the unit provide a cash control so that the owner will know precisely the total number of drinks that have been dispensed, as well as the number of drinks in each of several price categories.

Other objects and advantages will appear in the course of the following description.

The drawings illustrate the best mode presently contemplated of carrying out the invention.

In the drawings.

The drawings illustrate an apparatus for metering and dispensing liquids, such as alcoholic liquors, which comprises a rack 1 supporting a series of bottles 2 containing individual liquids to be dispensed. As illustrated in the drawings, the apparatus is adapted to dispense alcoholic liquors as well as blend the liquors to provide mixed drinks and thus the bottles 2 contain the basic components such as whiskey, gin, scotch, vermouth, vodka, and the like. The apparatus also includes a dispensing unit 3 from which the liquors and mixed drinks are dispensed through operation of a series of push buttons on a control panel 4.

Figure 1:
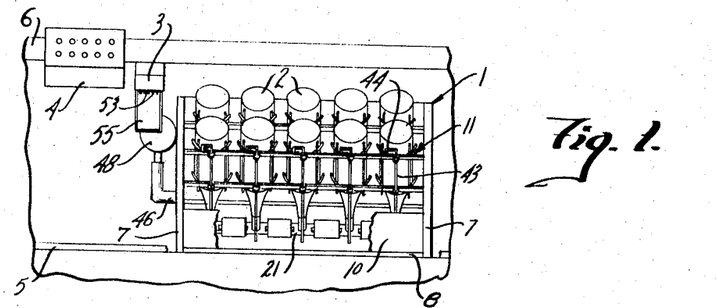
FIG. 1 is a front elevation showing the dispensing apparatus of the invention as mounted on a bar.
Figures 2, 3:
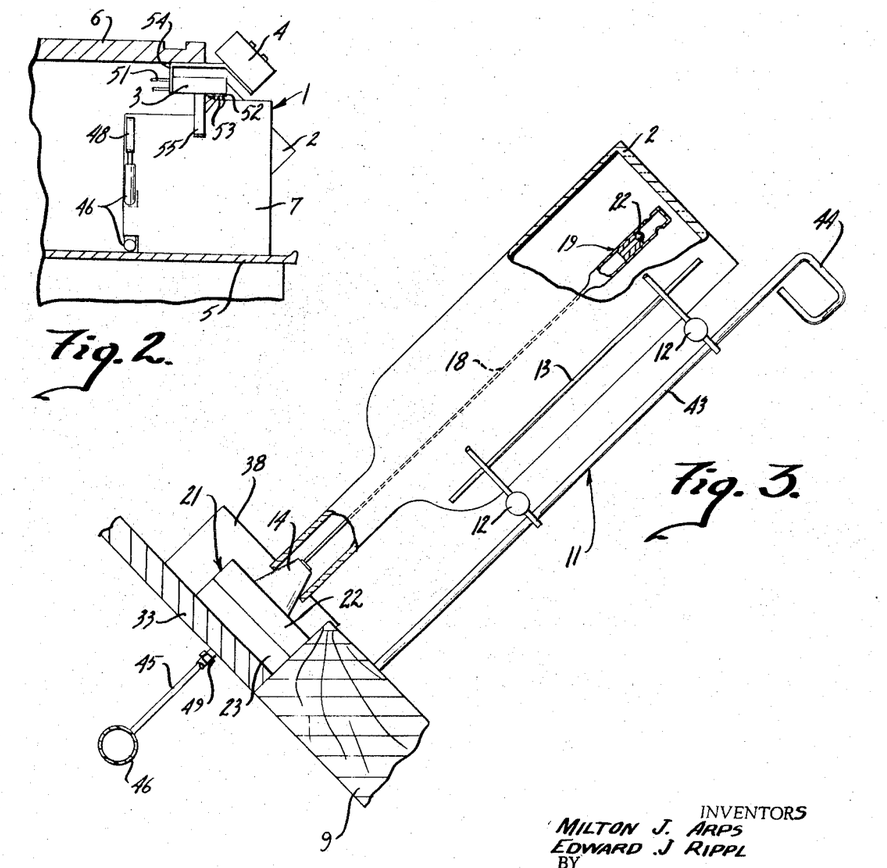
FIG. 2 is an end view of the structure shown in FIG. 1.
FIG. 3 is an enlarged fragmentary vertical section showing a bottle mounted on a rack.

As shown in FIGS. 1 and 2, the rack 1 is supported on the drainboard 5 of the bar 6, while the control panel 4 is mounted angularly on the upper portion of the bar where it can be readily operated by the bartender. The dispensing unit 3, as shown in FIG. 1, is located beneath the bar 6 adjacent the control panel 4. In the usual arrangement, the dispensing unit 3 and control panel 4 will be located on the front bar at a location where it is readily accessible to the bartender. The rack 1 which contains the bottles 2, while shown in the drawings to be located on the drainboard 5 adjacent the control panel 4, can be located on the back bar or at any other remote location with respect to the dispensing unit 3 and control panel 4, if desired.

The bottle rack 1 includes a pair of side walls 7, a bottom wall 8 and a diagonal wall 9 which extends between the side walls 7. In addition, the rack includes a partial front wall 10 which is connected to the bottom wall.

The bottles 2 are held in the rack 1 by a wire frame 11 which includes a series of generally horizontal rods 12 connected between the side walls 7. The rods 12 support a series of curved cradles 13 which support the bottles 2.

The bottles 2 are inverted and positioned at an angle of about 30° with respect to the vertical. The angularity of the bottles is not critical and the bottles can be arranged vertically or at any desired angle. The neck of each of the bottles 2 is enclosed by a rubber stopper 14 having a central core or plug 15. The plug 15 is provided with a liquid outlet opening 16 and a gas inlet opening 17. To supply gas to the bottle, a tube 18 is connected to the inlet opening 17 and extends upwardly within each of the bottles 2. The upper end 19 of each tube 18 is enlarged and a conventional ball-type check valve 20 is located within the enlarged end 19 and serves to permit the flow of gas upwardly into the bottle but prevents the flow of liquid downwardly within the tube 18.

Figures 4, 5:
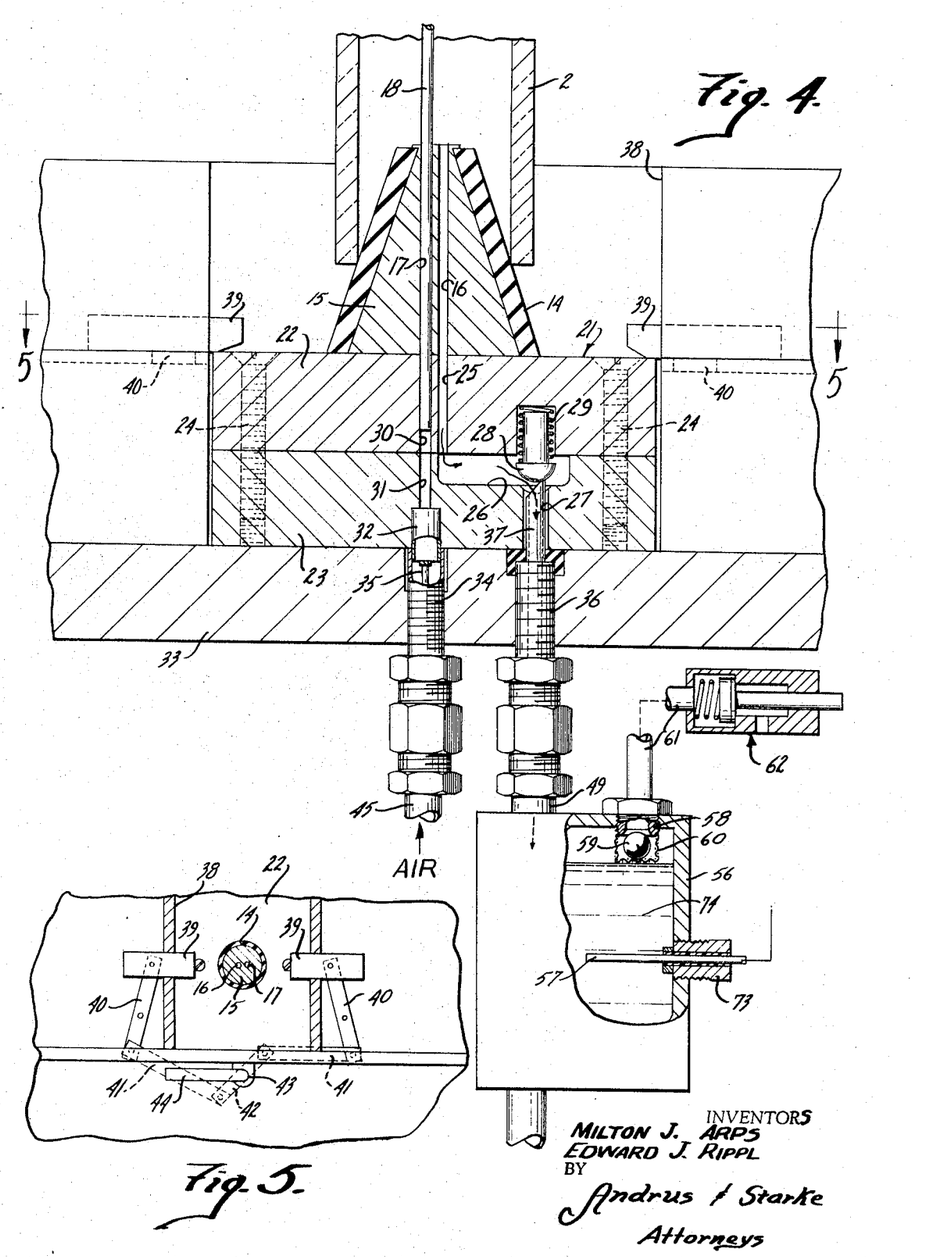
FIG. 4 is an enlarged fragmentary vertical section showing the fluid control unit and the pneumatic and liquid connections.
FIG. 5 is a section taken along line 5—5 of FIG. 4 with the bottle and fluid control unit removed.

As best shown in FIG. 4, the plug 15 is formed integrally with a fluid control block 21 which includes an upper plate 22 and a lower plate 23 connected by a series of screws 24. Formed in the upper plate 22 is a liquid passage 25 which communicates with the opening 16 in the plug 15. The lower plate 23 is provided with a recess 26 which connects passage 25 and a passage 27 formed in the lower plate. The upper end of the passage 27 defines a valve seat which is closed off by a valve 28. Valve 28 is urged to the closed position by a coil spring 29 which is seated within a recess formed in the upper plate 22.

The plates 22 and 23 are formed with air passages 30 and 31, respectively, which are connected to the gas passage 17 in the plug 15. The lower air passage 31 is formed with a downwardly extending tubular projection 32 which projects a substantial distance beneath the lower surface of the plate 23.

A manifold or connecting bar 33 is positioned beneath each row of bottles 2. A series of tubes 34 are threaded within holes in bar 33 and the tubes are located in alignment with passages 31 in the lower plates 23 of blocks 21. A conventional spring-loaded valve 35 is located in each of the tubes 34, and when the block 21 rests on the bar 33, the tubular projection 32 in each of the passages 31 will engage the valve 35 and open the valve so that gas can flow upwardly through the tube 34 into the bottle 2.

In addition to the gas passages, a second series of tubes 36 are threaded within openings in bar 33 and each tube 36 communicates with a liquid passage 27 in lower plate 23. A tubular projection 37 extends upwardly from each tube 36 and when the block 21 rests on the manifold bar 33, the projections 37 engage the valves 28, as shown in FIG. 4, to open the valves 28 against the force of springs 29 and permit the liquid within the bottles 2 to flow downwardly into the liquid tubes 36.

When one of the bottles 2 is empty, the bottle and the attached fluid control block 21 are removed from the manifold bar 33 causing the projections 32 and 37 to move out of contact with the valves 35 and 28 to thereby close the liquid passage in the block 21 and close the gas passage in the manifold bar 33.

Each block 21 is adapted to be locked in a generally receangular recess 38 formed in the diagonal wall 9 by a pair of locking bars 39 which are located within cavities formed in the wall 9. As best shown in FIG. 5, each of the locking bars 39 is connected through toggle links 40 and 41 to a bar 42 which is connected to a shaft 43. Shaft 43 extends upwardly from the wall 9 in generally parallel relation to the axes of the bottles 2. The upper end of each of the shafts 43 is provided with a handle 44. With this construction, pivotal movement of the handle 44 in one direction will move the locking bars 39 to a position over the upper plates 22 of blocks 21, as shown in FIG. 4, to clamp or lock the blocks in the recesses 38. By rotating the handle 44 in the opposite direction, the locking bars 39 will be moved inwardly within the cavities in the wall 9 to a location where they will not interfere with the removal of the blocks 21 from the recesses 38.

As the locking bars 39 engage the upper surface of the control block 21 when in the locking position, it is necessary that the block 21 be disposed in tight engagement with the manifold bar 33 in order for the bars 39 to be pivoted to the locking position. Thus, the projections 32 and 37 must be in alignment with the corresponding passages and in engagement with the valves 35 and 28 before the locking bars 39 can be moved to the locking position. This insures that the gas line and liquid line connections are properly made when the control block is locked to the manifold bar.

Figure 6:
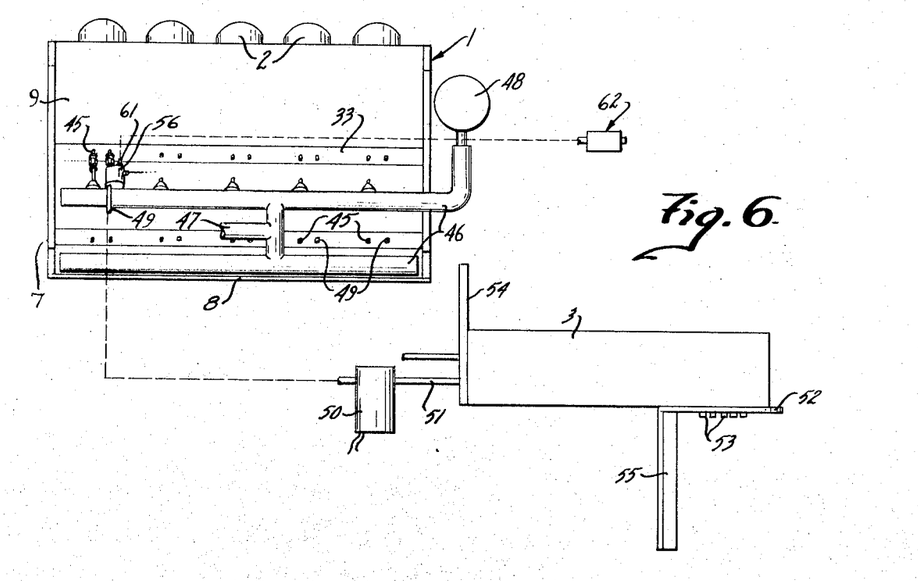
FIG. 6 is a rear elevation of the dispensing apparatus with a solenoid valve and the dispensary shown diagrammatically.

Air or other gas under pressure is supplied to each of the air tubes 34 in bar 33 through an air line 45, and the air lines 45 associated with each row of bottles 2 are connected to manifold 46, as shown in FIG. 6. Manifolds 46 in turn are connected to an air inlet pipe 47 which communicates through a conventional pressure regulator, not shown, with a source of gas under pressure. A suitable pressure gauge 48 is located in one of the manifolds 46 and indicates to the operator the pressure of the gas within the system. The magnitude of the pressure of the gas acting on the liquid within each of the bottles is not particularly critical and it has been found that low pressure generally in the range of 2 to 5 p.s.i.g. is sufficient to provide the desired rate of flow of the liquid from the bottles 2.

Each of the tubes 36 in the bars 33 is connected by a liquid line 49 to a solenoid valve 50 and the valves 50 are located adjacent the dispensing unit 3. The outlet of each valve 50 is connected by a tube 51 to the dispensing unit 3, and the lower surface of the dispensing unit is provided with a disc 52 having a series of outlets 53 and each outlet is connected to one of the tubes 51. Each of the bottles 2 is connected separately to an individual outlet 53 at the dispensing unit 3 so no mixing of the various liquids in a common line will occur. The various outlets 53 are arranged in a generally circular pattern in the disc 52 and the axis of each outlet 53 is generally vertical.

As shown in FIG. 2, the dispensing unit 3 is supported from the bar 6 by a bracket 54 and a generally curved bumper or guard 55 is attached to the dispensing unit and extends downwardly from the rear portion of the disc 52. The guard or bumper 55 is adapted to be engaged by the glass as it is inserted beneath the outlets 53, and thereby positions the glass in alignment with the outlets. The bumper 55 can be made out of plastic or plastic or rubber coated metal to provide a surface which will not damage or mar the glass being inserted under the outlets 53.

With the apparatus of the invention, gas pressure acting on the surface of the liquid within the various bottles 2 forces the liquid from the bottles through the liquid lines to the dispensing unit. This pressurized delivery provides definite and positive advantages over a gravity feed system. The pressurized delivery, by utilizing a pressure regulator, maintains a constant pressure in the gas lines and bottles at all times, thereby providing a better control of the volume of liquid being discharged. With a gravity feed system, a greater pressure head exists when the bottle is full than when it is empty, and utilizing a timed delivery cycle with gravity feed would result in a greater quantity of liquid being discharged under a higher pressure head than at a lower pressure head. This is not true of a pressurized system, for the pressure on the liquid is constant at all times, resulting in a uniform volume of liquid being dispensed in a given time period regardless of whether the bottles are empty or full. Further, the pressurized feed insures a positive flow of liquid at all times. In contrast, liquid in a gravity feed system will not flow unless air is introduced into the evacuated portion of the bottle.

As an added advantage, the pressurized system utilizing the solenoid valves 50 prevents any dripping of liquid from the outlets 53. This is an important feature because if one liquid dripped into the glass into which a second liquid was being dispensed, it could alter the flavor of the drink being poured. In the present invention, the liquid line 51 leading from the valve 50 to the outlet 53 is filled with liquid at all times. Due to the small diameter of the liquid line piping and the surface tension of the liquid, there will be no drippage of liquid at the outlet 53 when the solenoid valve 50 is closed.

With the use of the pressurized delivery system, it is possible to move the liquid from the bottles 2 through substantial distances to the dispensing unit 3. This is not true of a gravity feed system in which the length of the liquid lines extending from the bottles to the dispenser is limited.

Moreover, the pressurized delivery system provides high speed delivery and it has been found that a three-ounce drink can be dispensed in a period of only two seconds.

A provision is made to indicate when each bottle 2 is empty and also prevent the dispensing of drinks of partial or fractional volume. Each of the liquid lines 49 is provided with an enlarged reservoir 56 and a suitable probe or other liquid sensing element 57 is connected in the reservoir 56. When the liquid level within the reservoir 56 is sufficiently high to contact the probe 57, the electrical circuit, as will be hereinafter described, will be operative. However, if the liquid level falls below the probe 57 due to the bottle 2 and line 49 becoming empty, the circuit will be opened to prevent further quantities from being dispensed from that particular liquid line.

As a bottle empties and the liquid level falls within the reservoir 56, the pressurized gas within the bottle will also fill the upper portion of the reservoir 56 above the liquid level. Subsequently, when a full bottle 2 is installed in the rack, the cushion of air in the upper portion of the reservoir 56 will prevent the liquid in the reservoir from rising to the level of the probe 57 so that the electric circuit will not be closed. Thus, a provision is made to release the air within the reservoir 56 when installing a full bottle in the rack 1. To release the air, an outlet 58 is formed in the upper end of the reservoir 56 and the outlet is adapted to be closed by a float valve 59 which is retained within a cage 60. The outlet 58 is connected to a vent line 61 which extends to the control panel 4. A manually operated push-button type valve 62 is located on the control panel 4 and is connected to the vent line 61. By opening valve 64, the gas within reservoir 56 will be vented through line 61.

As a new bottle 2 is inserted in the rack 1 and the gas and liquid connections are made through the valve block 21, the liquid will flow downwardly into the reservoir 56. At this time, the operator opens the valve 62 to permit the gas contained within the reservoir 56 to escape. The operator maintains the valve 62 in the open position until the liquid level in the reservoir has reached the level of the probe 57, as indicated by a light on the control panel. In operation, the entire reservoir 56 can be filled with liquid or the liquid level can be anywhere above the bottom of the probe 57 leaving a small air head within the top of the reservoir 56. The float valve 58 will rise with the liquid level and prevent the flow of liquid through the vent line 61 in the event the operator holds the valve 62 open for an extended period.

The console or control panel 4 is a generally rectangular member having push buttons related to the main available liquors such as gin, whiskey, scotch, rum and vodka as well as the several mixed drinks to be dispensed. The push buttons operate switches which close momentarily.

Figure 7:
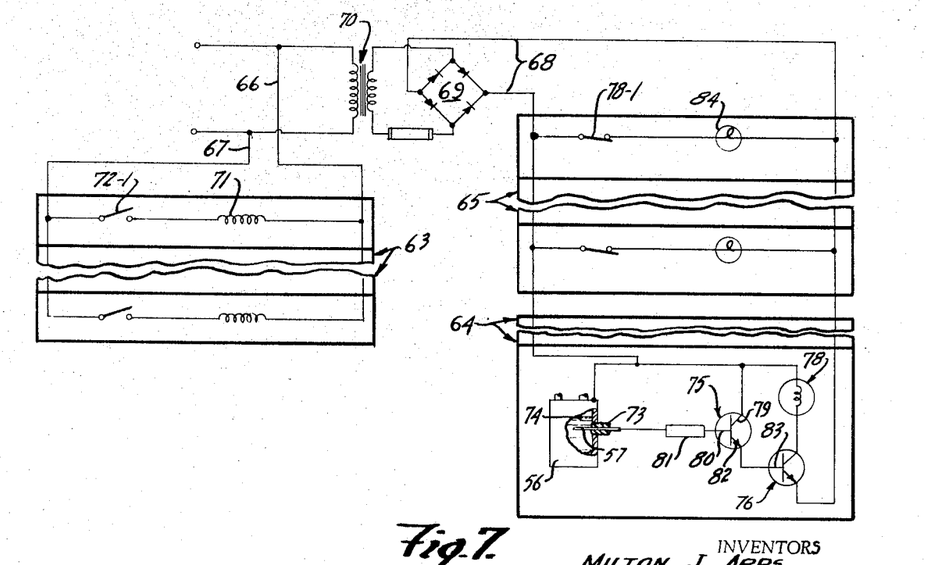
FIG. 7 is a wiring diagram of the operating circuit.
Figure 8:
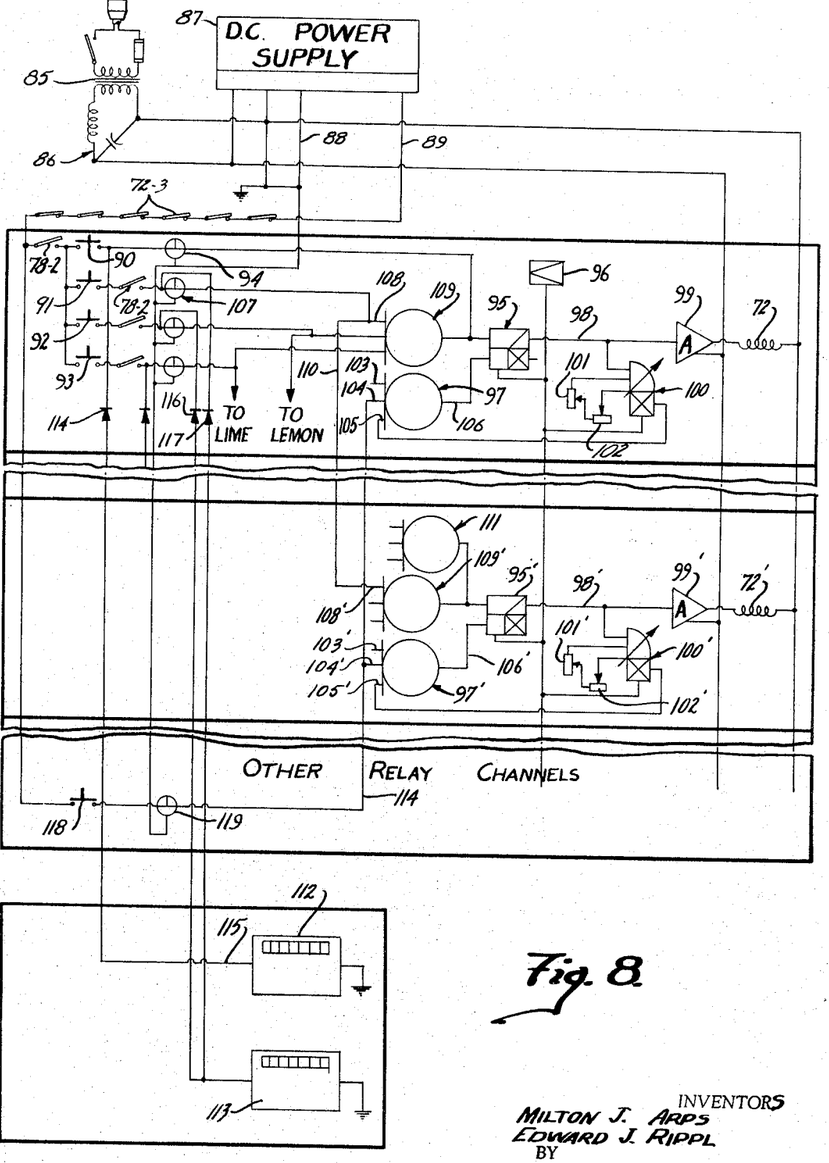
FIG. 8 is a wiring diagram of the control circuit.

The electrical operating system is shown including an operating circuit shown in FIG. 7 and a logic control circuit, shown in FIG. 8, for energizing the circuit components of FIG. 7.

Referring particularly to FIG. 7, the operating circuit is shown for actuating the solenoid valves 50 in dispensing nozzle lines 49 and effecting related discharge of the liquids is shown.

The illustrated operating circuit of FIG. 7 generally includes a liquid discharge section 63 for actuating valves 50, a liquid sensing section 64 for sensing the presence of liquid in the several bottles 2 and a bottle condition indicating section 65. Each section comprises a plurality of similar channels and one is described.

The liquid discharge section 63 is connected in parallel to suitable alternating current power lines 66 and 67 which are connected to a suitable alternating current power supply. The liquid sensing section 64 and bottle condition indicating section 65 are connected to low voltage direct current supply lines 68 which are connected to the alternating current supply through a full wave rectifier 69 and a step-down transformer 70.

The liquid discharge section 63 includes parallelled branch circuits, one for each of the bottles 2. Each branch circuit includes a winding 71 of the corresponding solenoid valve 50 and a set of normally open contacts 72–1 forming a part of an activating relay 72 connected in the logic circuit of FIG. 8, as subsequently described. Relays 72 provide for a timed energization of the solenoids 50 to accurately dispense a preselected quantity of the liquid from the related bottle 2.

Additionally, as previously noted, each of the bottles is provided with a sensing means forming a part of the liquid sensing section 64 for determining when a bottle 2 is empty and providing an electrical interlock to prevent operation of the circuit for drinks involving that bottle. The present system includes the probe 57 mounted in the reservoir 56 in discharge line 49 immediately below the outlet at the bottle rack. Probe 57 is mounted in a suitable insulating bushing 73 which in turn is threaded into an opening in the metallic wall of the reservoir 56. An electrical circuit is completed through the liquid between the metallic wall and probe 57. In the presence of a liquid, a small current, in the order of microamperes, flows in an input circuit to the liquid sensing section 2. In the illustrated embodiment of the invention, the sensing section 2 includes a pair of transistors 75 and 76 interconnected to operate a disconnect relay 78 in accordance with the presence and absence of a signal. The first transistor 75 has a collector 79 connected to the positive power line 68 in common with the metallic wall of reservoir 56 and a base 80 connected through a limiting resistor 81 to the sensing probe 57. The transistor 75 has an emitter 82 connected to the base 83 of the output second transistor 76 which is connected in a common emitter configuration in series with relay 78 to the power line 68.

In operation, the presence of liquid within the transfer passageway maintains a small signal applied to the base 80 of the first transistor 75 and biases it to conduct. This holds the base of the second transistor 76 at a sufficiently positive potential to cause the second transistor 76 to turn on, thereby energizing the relay 78 and holding the related contacts in a normal operational standby position. When a related bottle is empty, the liquid drops below the level between the probe 57 and the holding signal is removed from the transistor 75 which is then biased to turn off. In turn, the signal to transistor 76 is removed and turns off to de-energize relay 78 and actuate its contacts to indicate that the bottle is empty, as follows.

Relay 78 controls normally closed contacts which are connected in the bottle condition indicating section 65 and normally open circuit in the logic circuit of FIG. 7 which contacts are identified by corresponding relay numbers and distinguishing sub-numbers. As more fully developed hereinafter, certain bottle relays control a substantial plurality of different branch circuits and although a single relay 78 may actuate all contacts, the illustrated single relay may control other relays to effect the described switching. Such circuit design will be readily made by those skilled in the art and the single relay is shown for simplicity and clarity of explanation.

In the indicating section 65, relay contacts 78–1 are connected in series with an "empty" indicating lamp 84 which is suitably mounted on console or control panel 4 and preferably behind the appropriate push button. When contacts 78–1 are held open, the associated lamp 27 is not lit and indicates the related bottle and more particularly the reservoir 56 includes liquid. When the liquid level drops below the probe 57, relay 78 is deenergized and the normally closed relay contacts close, causing the "empty" light to illuminate.

Referring to the logic control circuit of FIG. 8, relay 72 is energized to actuate solenoid valves 50 as follows. A 155 volt supply is connected through a transformer 85 and a filter 86 as the input to a direct current (D.C.) power supply 87 and to the plurality of alternating current drink control relays 72 which are connected to actuate the related solenoid valves 50 in the dispensing nozzle lines 49, as shown in FIG. 6.

The direct current power supply 87 may be any well known A.C. to D.C. converting unit to provide suitable D.C. voltages for operation of the various logic and control components. The output of supply 87 includes the reference or ground line 88 and a 125 volt line 89 connected as a main input line to the logic circuitry. Additionally, the operational and standby bias for the several components is taken from supply 87 but has not been shown for simplicity of explanation.

Generally, the illustrated logic circuit employs a plurality of similar logic channels for actuation of each of the relays 72. The logic circuitry is shown in detail for two channels related to a main input push button switch 90 assumed to be related to gin and a mixed drink related push button switch 91 assumed to be for a martini. Switches 92 and 93 for the two other related mixed drinks derived therefrom are also shown; for example, a tom collins and a gimlet. Further, the corresponding elements of the logic channels will be identified by similar numbers in accordance with that of the gin channel and differentiated by prime numbers.

All channels have input connections parallel connected to the negative 125 volt line 89 in series with a plurality of contacts 72–3 of relays 72, one for each of the main liquor related relays. Contacts 72–3 are normally closed. When the related relay 72 of any one of the relays is energized, the related contacts open and input control power is removed such that the push button switches are inoperative until that drink is completed. Consequently, only one drink is set up in the control and accidental mixing of two drinks is prevented.

Further, the push button switches 90 through 93 all have one side connected to line 89 in series with a set of normally closed contacts 78–2 of the sensing relay 78 which is energized by the probe 57 related to the gin line 49. Thus, when the gin bottle is empty, the logic circuit for gin and all related drinks is immediately opened. If the empty signal is received during a dispensing cycle, the gin in line 49 between reservoir 56 and the nozzles 53 is sufficient to complete the drink.

In the illustrated embodiment of the invention, the several logic components are schematically and symbolically shown. The specific circuits can be of any suitable form such as illustrated in the General Electric Bulletin GPC–B53D "Transistorized Static Control" and published by the General Control Department of Bloomington, Illinois.

Referring particularly to the gin relay channel, the logic circuit includes the push button switch 90 in series with an original input device 94 adapted to reduce the voltage level from 125 volts to a suitable level for the following logic components.

The output of the input device 94 is connected directly to a memory logic device 95 defined as an "off-return" memory device.

The "off-return" memory device 95 includes three inputs, one of which is connected to the input device 94, the second of which is connected to a reset logic device 96 and the third of which is connected to an "or" logic device 97. The reset logic device 96 is connected to the memory device 95 to provide a delayed "on" signal to it and all other memory devices and places all of them in an initial standby condition. The standby condition of the "off-return" memory device 95 is selected to establish an "off" or "no" signal at an output line 98. When an input signal is applied to the device 95 via the input device 94 as by closing of push button switch 90, an output signal appears at the line 98 which is maintained until an "off" signal is applied to the second input by the "or" logic device 97. The output line 98 is connected to an amplifier 99 which is connected in series with the gin relay 72 across the A.C. power lines. The amplifier 99 is biased to conduct by the signal at line 98 and operatively energizes relay 72. The A.C. amplifier 47 is a standard well known device and no further description thereof is given.

Simultaneously with energization of relay 72, the signal at line 98 is applied to a solid state time delay device 100 which is adapted to produce a reset control signal a preselected time after receiving the input signal. The time constant of the delay device 100 is adjustable through a pair of series connected and continuously adjustable linear potentiometers 101 and 102, shown connected in series to the time delay device 100. A pair of linear potentiometers 101 and 102 is shown to provide coarse and fine adjustment of the time cycle, although a single potentiometer generally provides sufficiently accurate control for practical applications. The time delay device 100 provides a reset control signal which is connected to the "or" logic device 97.

In the illustrated embodiment of the invention, the "or" device is provided with three input lines 103, 104 and 105 and a single output line 106. Such a logic device 97 normally has an "on" or positive voltage signal at its output line and the voltage is removed by applying an "on" signal or voltage at any one of the three inputs. The output of the "or" circuit is connected to the second input of the "off-return" memory device 95. Assuming the first signal from input device 94 has been removed, the signal at the second input from device 97 causes the "off-return" memory device 95 to revert to its initial condition with the output signal at line 98 returning to the "off" state.

If only gin is desired, the signal is transmitted directly to the "off-return" memory device 95 which in turn transmits a signal to the amplifier 99 and the time delay device 100 for operation of the gin relay 72. After the timing device 100 has timed out in accordance with the potentiometer setting the device 95 is turned off and relay 72 is de-energized. Thus, gin is delivered through the associated nozzle 53 for a very closely regulated time period. When a mixed drink is desired, one of the related push button switches 91, 92 or 93 is actuated.

As previously noted, the output side of the interlock relay contacts 78–2 is connected in common to the parallel related push buttons 90, 91, 92 and 93 for each of the associated gin drinks, the martini, tom collins and gimlet and they can be obtained only if gin is available. The mixed drink push buttons further control other appropriate relays 72 for dispensing the secondary drink of the combinations; respectively, dry vermouth, lemon, and lime.

In each case, the related push button 91, 92 or 93 is connected to a voltage reducing device 107 through a pair of interlocking normally closed contacts 78–2 of a secondary ingredient sensing relay 78. For example, the martini which employs dry vermouth has the normally closed contacts 78–2 related to the vermouth bottle therein. If the vermouth bottle is empty, the relay contacts 78–2 open the martini circuit and prevent erroneous dispensing of a supposed martini. The lack of a drink, if not otherwise noted to the operator through the warning system previously described, immediately draws his attention to the necessity for replenishing of the vermouth.

Assuming the circuit is properly set up and all bottles are properly filled, the closing of push button switch 91 transmits a signal through the voltage reducing device to a first input line 108 of another "or" logic device 109 in the channel of the gin relay 72 and simultaneously through a connecting line 110 to a first input line 108' of the "or" logic device 109' in the channel of the dry vermouth bottle relay 72'. As previously noted, an input signal to "or" logic device 109 causes them to change their condition and establish an output signal to the related "off-return" memory devices 95 and 95', each of which transmits an output signal to the corresponding amplifier 99 and 99' and the related time delay device 100 and 100'. During the presence of the signal, the gin relay 72 and the vermouth relay 72' will be energized. When the relays 72 and 72' are energized, the associated contacts 72–1 and 72–2 in the operating circuit 63 of FIG. 7 are closed and energize solenoid windings 71. Normally, as is well known, the amount of vermouth added to a martini is substantially less than that of the gin and consequently the timing device 100' for the vermouth relay 72' has its potentiometers 101' and 102' set for a substantially shorter time period to provide the desired amount of the vermouth for the related martini. The circuits of both channels automatically reset in the same manner as previously described with respect to dispensing of gin alone.

Certain of the liquids may be employed in more than three different mixed drinks and the logic device 109 must be constructed to accommodate the additional drinks or another similar "or" logic device 111 can be parallel with the device 109, as shown for the vermouth channel.

The illustrated embodiment of the present invention also includes a drink counting circuit, as shown in FIG. 8. Generally, the various drinks will be grouped in accordance with the retail price or price bracket and separate counters provided for each group. In FIG. 8, only two counters 112 and 113 are shown for simplicity and clarity. The counters 112 and 113 may be of any suitable construction; for example, electromechanical devices having operating direct current solenoids, not shown, adapted to be operated from the power at line 89. The counter 112 is shown connected to record dispensing of each straight shot of gin, as follows. An isolating diode 114 connects the input line 115 of counter 112 to the output side of push button switch 90 to actuate the counter 112 each time switch 90 is closed. Counter 112 is a fast-response device which performs the counting function before the disconnect contact 72–3 in line 89 opens and removes power as previously described.

Any number of push button switches can be similarly connected to actuate the counter related to the corresponding price bracket. For example, counter 113 is separately connected to the output side of push button switches 91 and 92, assumed to be in a common price bracket, by corresponding isolating diodes 116 and 117.

Additionally, an emergency stop push button switch 118 is provided and connected by an input device 113 and a common "stop" line 119 to the inputs 104 of all the resulting "or" logic devices 97.

Correspondingly related circuits are provided and similarly interconnected for each of the other main liquids and the secondary liquids mixed therewith.

While the above description has been directed to the dispensing of alcoholic liquids, it is contemplated that the apparatus can be used to meter, blend and dispense all types of liquids, such as inks, dyes, paints, food products, and the like.

Various modes of carrying out the invention are contemplated as being within the scope of the following claims particularly pointing out and distinctly claiming the subject matter which is regarded as the invention.

I claim:

1. In an apparatus for metering and dispensing a liquid, a container having an opening and adapted to contain a liquid, gas supply means connected through the opening for supplying a gas under pressure to the interior of the container, liquid discharge means connected through said opening for discharging liquid from the container, a dispensing unit located remotely with respect to the container, conduit means connecting the liquid discharge means and the dispensing unit, valve means disposed in said conduit means for controlling the flow of liquid through said conduit means to the dispensing unit, a reservoir in said conduit means and located between the liquid discharge means and said valve means, liquid sensing means disposed in the reservoir and responsive to the presence of liquid in said reservoir, said liquid sensing means being operably connected to the valve means for preventing the opening of said valve means when the liquid falls beneath said liquid sensing means, a gas vent conduit communicating with the upper portion of the reservoir, and second valve means connected in the gas vent conduit and located outside of the reservoir for venting the gas from said reservoir when a container is installed with the liquid discharge means.

2. The structure of claim 1, and including third valve means associated with the gas vent conduit and located within the reservoir for permitting the flow of gas from said reservoir and for preventing the flow of liquid from said reservoir through said gas vent conduit.

3. In an apparatus for metering and dispensing a plurality of liquids, containers with each container having an opening and adapted to contain a liquid, gas supply means connected through the opening for supplying a gas under pressure to the interior of the containers, liquid discharge means connected through said opening for discharging liquid from the containers, a dispensing unit located remotely with respect to the containers, individual conduit means separately connecting each of the liquid discharge means and the dispensing unit, separate valve means disposed in each of said conduit means for controlling the flow of liquid to the dispensing unit, separate electronic timing means having output means operably connected to corresponding valve means for opening the valve for a given period of time to thereby permit a given quantity of liquid to be discharged to said dispensing unit, input switch means connected to a common power source means and to selected timing circuits to trigger the corresponding timing circuits, and disconnect switch means to open the connection to common power source means in response to operation of any of said valve means.

4. In an apparatus for metering and dispensing a plurality of liquids, containers with each container having an opening and adapted to contain a liquid, gas supply means connected through the opening for supplying a gas under pressure to the interior of the containers, liquid discharge means connected through said opening for discharging liquid from the containers, a dispensing unit located remotely with respect to the containers, individual conduit means separately connecting each of the liquid discharge means and the dispensing unit, separate valve means disposed in each of said conduit means for controlling the flow of liquid to the dispensing unit, separate electronic timing means having output means operably connected to corresponding valve means for opening the valve for a given period of time to thereby permit a given quantity of liquid to be discharged to said dispensing unit, input switch means connected to a common power source means and to selected timing circuits to trigger the corresponding timing circuits, disconnect switch means to open the connection to common power source means in response to operation of any of said valve means, a plurality of electrically actuated counters for recording dispensing of the liquids, and circuit means connecting the counters to the connection of the input switch means to the timing circuits for operation in response to actuation of the corresponding input switch means.

5. In an apparatus for metering and dispensing a plurality of liquids, containers with each container having an opening and adapted to contain a liquid, gas supply means connected through the opening for supplying a gas under pressure to the interior of the containers, liquid discharge means connected through said opening for discharging liquid from the containers, a dispensing unit located remotely with respect to the containers, individual conduit means separately connecting each of the liquid discharge means and the dispensing unit, separate valve means disposed in each of said conduit means for controlling the flow of liquid to the dispensing unit, a separate electronic timing circuit for each of said containers and having output means operably connected to the corresponding valve means for opening the valve, each circuit including an "or" input device having a plurality of input terminals to permit simultaneous operation of different combinations of the valve means and having adjustable means for presetting the time period of each timing circuit, and input switch means connected to preselected different combinations of the input terminals of the "or" input devices for dispensing corresponding different combinations of the liquids.

6. In an apparatus for metering and dispensing a plurality of liquids, containers with each container having an opening and adapted to contain a liquid, gas supply means connected through the opening for supplying a gas under pressure to the interior of the containers, liquid discharge means connected through said opening for discharging liquid from the containers, a dispensing unit located remotely with respect to the containers, individual conduit means separately connecting each of the liquid discharge means and the dispensing unit, separate valve means disclosed in each of said conduit means for controlling the flow of liquid to the dispensing unit, a separate electronic timing circuit for each of said containers and having output means operably connected to the corresponding valve means for opening the valve, each circuit including an "or" input device, a main liquid switch for a liquid common to a plurality of combinations, a plurality of input switch means one for each of the plurality of combinations and each having a common side for connection to the main liquid switch and having an output side, a secondary liquid switch means for a secondary liquid common to one of said plurality of combinations connecting the output side of the input switch means to the "or" input devices of the containers for the corresponding combination, and means responsive to the liquid in each container to control the corresponding related main liquid switch and secondary liquid switch.

7. In an apparatus for metering and dispensing liquids, support means, a bottle to contain a liquid to be dispensed and having an outlet therein and having a bottom, said bottle being supported in a generally inverted position by said support means with said outlet facing downwardly and said bottom facing upwardly, a fluid control member associated with the bottle including a closure for said outlet with said closure having a gas inlet passage to be connected to a source of gas under pressure and a liquid outlet passage to be connected to a dispensing unit, said fluid control member being disposed in a recess in said support means, means for connecting the gas inlet passage to said source of gas under pressure and for connecting the liquid outlet passage to the dispensing unit when said fluid control member is positioned in said recess, and locking means for locking the fluid control member within said recess, said locking means including an operating member extending longitudinally of the bottle toward said bottom.

8. The structure of claim 7 in which said locking means includes a plurality of arms engageable with the upper surface of said fluid control member to lock the member within the recess.

9. The structure of claim 7 in which the recess faces generally upwardly and said fluid control member is slidably insertable within said recess.

10. The structure of claim 7, wherein said operating member is journalled for rotation in said support means.

11. An apparatus for metering and dispensing a liquid comprising a container having an opening and adapted to contain a liquid to be dispensed, gas supply means connected to the opening for supplying a gas under pressure to the interior of the container, liquid discharge means connected to said opening for discharging liquid from the container, a dispensing unit for dispensing liquid, conduit means connecting the liquid discharge means to the dispensing unit, said conduit means having an enlarged portion defining a reservoir, valve means disposed in the conduit means between the reservoir and the dispensing unit for controlling the flow of liquid through said conduit means to the dispensing unit, valve operating means for selectively opening said valve means to thereby dispense a given volumetric increment of liquid from the dispensing unit, and liquid sensing means responsive to the liquid level in said conduit means falling to a position beneath the container after the container has been emptied for preventing operation of said valve operating means and maintaining said valve operating means in the closed position.

12. The structure of claim 11, in which the reservoir is formed of a metallic material and the liquid sensing means is an electrical probe extending in electrical insulating relation through said reservoir and into the interior thereof, and an electrical circuit connecting said probe, said reservoir and said valve means to a source of electrical energy, said circuit being opened to close said valve means when the liquid level in the reservoir falls beneath said probe.

13. The apparatus of claim 11, in which the liquid sensing means is located in the reservoir and the volume of the conduit means between the dispensing unit and the location of said liquid sensing means is greater than said volumetric increment.

14. The structure of claim 11, and including a signalling device operably connected to said liquid sensing means for producing a signal when the liquid level falls below the location of said liquid sensing means.

15. The apparatus of claim 11 and including gas vent means communicating with said reservoir for conducting gas from said reservoir.

16. The apparatus of claim 15 in which said gas vent means is connected to said reservoir at a level above the liquid sensing means and said liquid sensing means is spaced above the bottom of said reservoir.

17. In an apparatus for metering and dispensing a liquid in volumetric increments, a rack, a plurality of bottles with each bottle adapted to contain a liquid and having an opening therein, means for supporting said bottles in a generally inverted position on said rack, a closure engaged with the opening of each bottle and having a gas inlet passage and a liquid outlet passage, conduit means connecting the gas inlet passage of each closure to a source of gas under pressure, a dispensing unit, a series of separate liquid conduits connecting the liquid outlet passages of the closures to said dispensing unit, valve means connected in each of said liquid conduits for controlling the flow of liquid through said respective conduits, a reservoir located in each conduit between the bottle and the respective valve means, each reservoir having a volume greater than the volumetric increment of the liquid to be dispensed and the upper end of the reservoir being located beneath the lower end of the respective bottle, timing means for selectively opening each valve means to thereby dispense a given volumetric increment of liquid from the dispensing unit, and liquid sensing means responsive to the liquid level in each liquid conduit falling to a position beneath the bottle after the bottle has been emptied for preventing operation of the respective timing means and maintaining said valve means in the closed position.

References Cited

UNITED STATES PATENTS

| | | | |
|---|---|---|---|
| 1,637,808 | 9/1927 | Armond et al. | 222—129.4 X |
| 2,383,507 | 8/1945 | Martin | 222—66 X |
| 2,645,379 | 7/1953 | Audia | 222—23 |
| 3,033,422 | 5/1962 | Totten | 22—66 X |
| 3,065,885 | 11/1962 | Chatten | 222—400.7 |
| 3,119,485 | 1/1964 | Bayers | 222—129.4 X |
| 3,127,073 | 3/1964 | Carlton | 222—400.7 |
| 3,144,962 | 9/1964 | Reynolds | 222—66 |
| 3,145,741 | 9/1964 | Smith | 222—70 X |
| 3,186,599 | 5/1965 | Levinson et al. | 222—400.7 |
| 3,193,143 | 7/1965 | Maieli | 222—129.4 |
| 3,200,994 | 8/1965 | Levinson et al. | 222—400.7 |
| 3,224,638 | 12/1965 | Harrel | 222—64 |
| 3,228,413 | 1/1966 | Stevens | 222—400.7 X |

FOREIGN PATENTS 386,861  12/1923  Germany.

ROBERT B. REEVES, *Primary Examiner.*

HADD S. LANE, *Examiner.*